(No Model.)
N. E. BROWN.
SLED STARTER.
No. 473,905. Patented May 3, 1892.
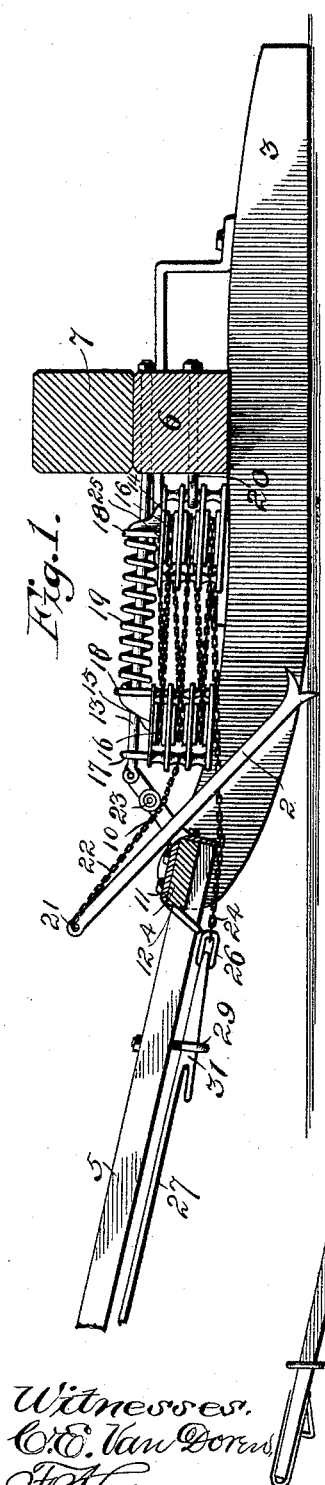
Witnesses.
C. E. Van Doren
F. F. Lyon
Inventor.
Nat E. Brown.
By Paul H. Merwin Attys.

UNITED STATES PATENT OFFICE.

NAT E. BROWN, OF ANOKA, MINNESOTA.

SLED-STARTER.

SPECIFICATION forming part of Letters Patent No. 473,905, dated May 3, 1892.

Application filed May 6, 1891. Serial No. 391,704. (No model.)

*To all whom it may concern:*

Be it known that I, NAT E. BROWN, of Anoka, in the county of Anoka and State of Minnesota, have invented certain Improvements in Logging-Sled Starters, of which the following is a specification.

My invention relates to means whereby large heavy loads on logging-sleds may be started by the exertion of a comparatively small power; and the object of the invention is to provide a device adapted to be attached to the forward bob-sled and through the medium of which a sled may be started forward on the frozen ground and iced ruts by one or more teams of horses.

My invention consists in the combination, with pulleys or drums provided upon the sled and in connection with a suitable chain, of a heavy starter-bar in connection with said pulleys, and the end of which is adapted to be fixed solidly against the frozen ground or ice, whereby a small force exerted to draw out the chain a considerable distance is converted into a great force exerted through a small space to force the bar back with respect to the sled, thereby moving the sled forward a short distance.

My invention consists, further, in various details of construction and in combinations hereinafter described, and particularly pointed out in the claims.

My invention will be more readily understood by reference to the accompanying drawings, in which—

Figure 1 is a sectional elevation of a front bob-sled provided with a starting device embodying my invention. Fig. 2 is a similar view showing the same embodied in a somewhat different form. Fig. 3 shows still another form in which it may be made. Figs. 4 and 5 are detail views of the starting-bar.

As shown in the drawings, my invention consists generally in the arrangement of the starting-bar 2, having the lower end adapted to engage the ground in connection with a power device, whereby with a comparatively small power the starting-bar is operated through a short distance to draw or rather push the sled forward. The power-multiplying device may be made in several ways; but I prefer those illustrated in Figs. 1, 2, and 3, the same being substantially the same with the exception of slight alterations made necessary by changes in the positions of the same with respect to the parts of the sled.

In the different figures, 3 represents the runner of a forward bob-sled, and 4 the cross-bar, extending between the ends of the runners and to which the tongue 5 is secured.

6 indicates the heavy bunk, extending across the runners and adapted to carry a large beam 7, upon which the logs rest. The rear bob of the sled need not be considered.

The bar 2 is provided with a broad and sharp foot. (Shown particularly in Figs. 4 and 5.) The lower prong 8 of the foot is at once pointed and convex, whereby the bar is prevented from slipping in any direction after being driven down into the ground. The upper prong 9 is flared up slightly, and serves to prevent the end of the bar from sinking too deeply into the ground.

In Figs. 1 and 2 the bar is shown to be loosely held on the cross-beam 4 by any lugs or iron arms 10, securely fastened by the bracket 11 to the part 4. A brace and tie 12 is provided in each instance to strengthen the device, that shown in Fig. 2 extending up to the end of the arms 10. One of these arms is provided on each side of the bar, and the same acts as a guide therefor. From the ends of the arms a strong brace-rod 13 extends back to a secure fastening in the bunk 6.

In Fig. 1 the power device is shown to be swung on the rod 13. This power device consists in the two sheave-blocks 14 and 15, each provided with three sheaves 16 and secured on the bar 13 by eyed lugs or brackets 17, two of which brackets are provided with broad faces 18, adapted to engage the end of a coiled spring 19, provided about the rod 13 and adapted to normally hold the pulley-blocks apart. The rear block 14 is fastened to the bunk 6 by a heavy ring 20. The forward block is adapted to move back and forth, and is connected with the forward end 21 of the bar 2 by the short chain 22, as shown. A small sheave 23 is provided between the arms 10, against which the chain presses. A stout long chain 24 extends from a fastening 25 on the block 14 over the six sheaves 16 in the different blocks and passes from the rear blocks forward to the coupling 26 on the reach-rod 27, as shown most plainly in Fig. 2. This reach-rod is loosely supported in stationary rings 28 and 29, and the team is hitched directly to the forward end of the rod. It will be seen that when the team draws ahead on the reach-rod 27 that the chain 24 will be drawn out quite a long distance, thereby carrying the blocks 14 and 15 toward one another and exerting a very heavy force through a short distance upon the starting-bar 2, whereby the sled is drawn or pushed forward a few inches to start the runners moving along on the frozen ground or ruts. As soon as the sled is started, the team is slacked up and hitched to the pole or other solid portion of the sled. In order to prevent delay at this time, I provide the means shown in Figs. 1 and 2 for quickly making draft connections. The reach-rod 27 is provided with the hook 31. Now when the team is backed up the spring 19 forces the blocks apart, thereby drawing back the chain and reach-rod, so that the hook is carried back of and into engagement with the ring 29, thus automatically hitching the team to the pole 5.

When it is wished to use the starter, the hook 31 is passed through the ring, as shown in Fig. 1, before the team is started ahead.

As my device is shown in Fig. 2, the blocks 32 and 33 are secured on a guide-bar 34, provided on the under side of the pole 5. The forward block is stationarily secured to the pole by the heavy pin 35, strengthened by the brace 36. The rear block is swung from the rod 34 by the loop or eyes 37 and is adapted to move forward. The chain 39 is fastened to the rear block 33 and passes from thence over the pulley 40 on the beam 4 and to the upper end 21 of the bar 2. The chain 41 is secured permanently at 42 and extends around the three pulleys in the block 33 and the two pulleys in the block 32 and is fastened to the rear end of the reach-bar 27. When the reach-bar 27 is drawn forward, it will be seen that the rear block will be pulled forward, thereby forcing back the bar 2 with respect to the sled. The block 33 is adapted to be forced back to its normal position by the coiled spring 38.

Fig. 3 shows another form in which my sled-starter may be embodied, and the same is, I think, somewhat preferable over the others. The heavy bar 43 is pivoted on the beam 4. The rear end of the bar 43 has the sheave-block with the sheaves 44 permanently secured to it. A brace 45 is provided to strengthen the shaft-bolt 46, which has a large eye 47 in its lower end adapted to freely admit the bar 2. The forward block has three sheaves 48 and is slidably secured on the rod 43 by the eye 49. The lower part of the forward block is permanently secured to the end 50 of the bar 2, as shown. A brace 51 extends from the bar 2 to a point beneath the eye 49. It will be seen that the whole starter-bar and power device is hinged to the bar 4 in such a way that the starter may be swung up and held out of contact with the ground when not in use. The chain 52 is secured at 53 to the braces 45 and from thence extends around all the sheaves and forward through the loop 54, provided on the forward end of the bar 2. From thence the chain extends to the draft connections 1. As power is exerted to draw forward the chain 52 the block 48 and the bar 2 are forced back against the tension of the coiled spring 55, arranged upon the rod 43 between the brackets 45 and 49. The spring serves to return the blocks to their normal positions after use, as above described in connection with Figs. 1 and 2. This last device is especially advantageous for the reason that it may be detached from one sled and quickly arranged for use on another.

It is obvious that rope could be employed in place of chain and that various other modifications of the power-multiplying devices would readily suggest themselves to one skilled in the art, and I therefore do not confine myself to the exact construction shown and described.

Having thus described my invention, I claim as new and desire to secure by Letters Patent—

1. The combination, in a device of the class described, of a sled with a starting-bar 2, a stationary block and a movable block, both provided with pulleys or sheaves, a chain or rope passing over the same, and a connection between said movable block and said bar, whereby upon the drawing out of said chain said bar is operated, substantially as described.

2. The combination, in a device of the class described, of the sled with a starting-bar 2, pulleys arranged in connection therewith and a chain passing over the same, and a reach-bar 27, provided with a hook 31, and a fixed loop or ring upon the sled, adapted to be engaged thereby, substantially as and for the purpose set forth.

3. The combination, in a device of the class described, of a starter-bar 2, arranged in connection with the cross-bar 4, blocks and pulleys arranged in connection therewith, a chain passing over the same and having its end fixed thereon, and a returning-spring adapted to normally hold said blocks apart, substantially as described.

4. The combination, in a device of the class described, of a sled with a bar 4, a rod 43, blocks having pulleys 46 and 48 arranged thereon, the starting-bar 2, having its forward end attached to the movable block, and the spring 55, substantially as described.

In testimony whereof I have set my hand this 1st day of May, 1891.

NAT E. BROWN.

In presence of—
HIRAM THORNTON,
W. W. FITCH.